July 10, 1945.   E. H. LAND ET AL   2,380,363
LIGHT POLARIZER AND PROCESS OF MANUFACTURE
Filed Oct. 18, 1941    2 Sheets-Sheet 1

INVENTORS
Edwin H. Land
Robert H. Blake
BY Donald L. Brown
Attorney

July 10, 1945.   E. H. LAND ET AL   2,380,363
LIGHT POLARIZER AND PROCESS OF MANUFACTURE
Filed Oct. 18, 1941   2 Sheets-Sheet 2
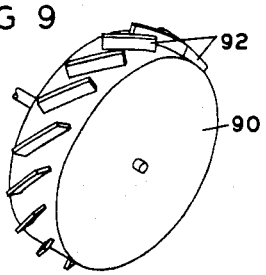
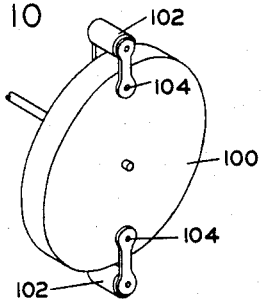
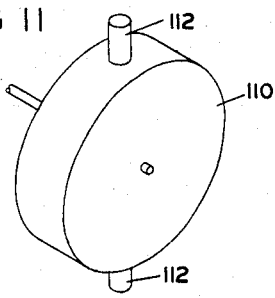
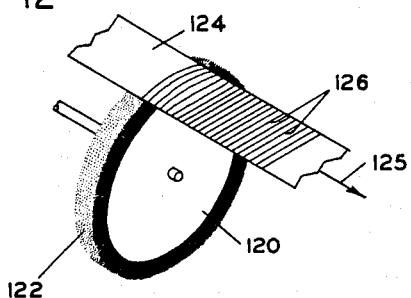
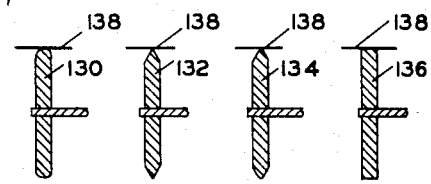
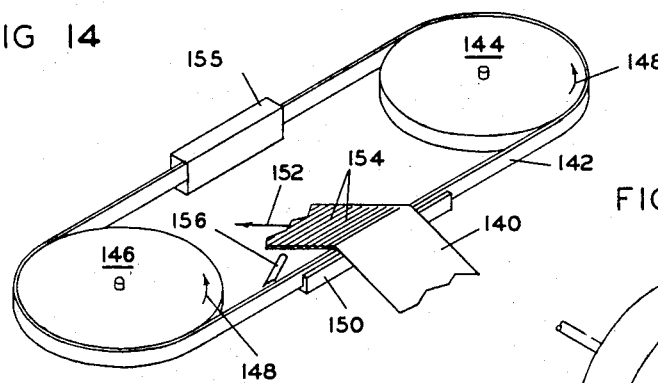
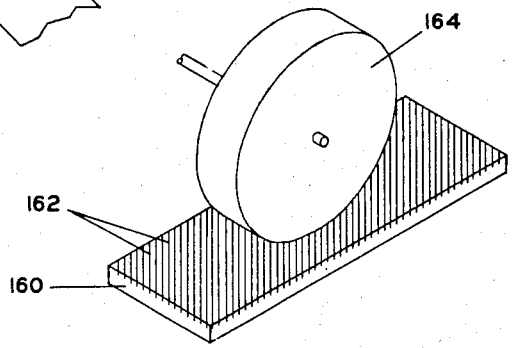
INVENTORS
Edwin H. Land
Robert P. Blake
BY
Donald L. Brown
Attorney Patented July 10, 1945

2,380,363

UNITED STATES PATENT OFFICE 2,380,363

LIGHT POLARIZER AND PROCESS OF MANUFACTURE

Edwin H. Land and Robert P. Blake, Cambridge, Mass., assignors to Polaroid Corporation, Dover, Del., a corporation of Delaware Application October 18, 1941, Serial No. 415,538

52 Claims. (Cl. 88—65)

This invention relates to oriented plastic material and to methods of manufacturing the same.

More specifically the invention relates to the manufacture of sheets of organic plastics which are adapted for conversion into light-polarizing sheets.

A principal object of the invention is to provide a sheet of a transparent plastic material and more specifically a sheet of polyvinyl alcohol or other linear, high polymeric plastic material, with the molecules adjacent one or both surfaces of the sheet arranged in substantial parallelism while the remaining molecules of the sheet and more specifically those molecules throughout the central portion of the sheet are heterogeneously or otherwise differently oriented from said surface molecules.

Other objects of the invention are to provide means for forming from a sheet of the character described a dichroic light polarizer; to provide from a sheet of the character described a sheet the surface or surfaces of which carry dichroic images the contrast of which is a function of the direction of vibration of transmitted light; to provide means and methods for the orientation of the surface molecules of a sheet of a plastic material of the character described; to provide a sheet of the character described in which the molecules adjacent one surface are oriented at substantially right angles to the direction of orientation of the molecules of the other surface; and to provide a sheet of the character described in which the oriented surface or surfaces are provided with a glossy finish.

Still further objects of the invention are to provide methods for the production of sheets of the character described wherein the surface or surfaces of the sheet to be oriented are brought into intimate contact with a rapidly moving element and orientation of the molecules of the surface layers is effected through frictional contact between the rapidly moving element and the sheet itself.

Other objects of the invention will in part be obvious and will in part appear hereinafter.

The invention accordingly comprises the several steps and the relation of one or more of such steps with respect to each of the others, and the product possessing the features, properties and the relation of elements which are exemplified in the following detailed disclosure, and the scope of the application of which will be indicated in the claims.

For a fuller understanding of the invention, reference should be had to the accompanying drawings, in which.

Figure 1:
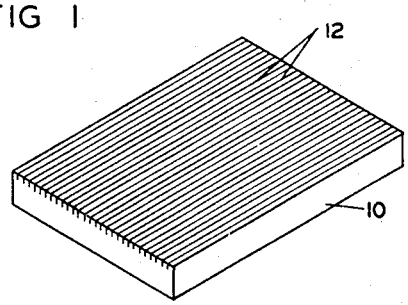
Figure 1 is a perspective view representing diagrammatically a sheet of a transparent plastic material of the character described which has the molecules of one surface oriented to substantial parallelism in a direction substantially parallel to an edge thereof.

Figs. 8 to 13 inclusive illustrate diagrammatically various forms of wheels or discs which may be employed in the production of the product of the invention;

Fig. 14 is a diagrammatic representation of a preferred form of apparatus for the production of the product of the invention; and Fig. 15 is a diagrammatic representation of means for buffing or imparting to the product of the invention a glossy surface such as has been previously described.

There have heretofore been developed various types of light-polarizing materials each comprising a sheet of a transparent plastic material the molecules of which have been oriented to substantial parallelism and which has been converted into a light-polarizing element by dyeing, staining or otherwise treating the sheet with a dichroic dye or stain, for example with a dichroic direct cotton dye or with a stain comprising iodine or with a stain containing a metal such, for example, as mercury. Speaking generally, preferred plastic materials for use in the production of such light polarizing materials have been found to comprise the class of plastics which may be defined as the linear, high polymeric plastic materials the molecules of which contain hydroxyl groups. Suitable materials for use in the manufacture of light polarizers of the character described and falling within the class of materials as defined are regenerated cellulose or Cellophane, polyvinyl acetal and polyvinyl alcohol and, of these materials, the preferred material is polyvinyl alcohol.

In the polarizers of the type described, the sheet of plastic material entering into the polarizing body is prepared by first heating or softening, and then by stretching until substantial orientation of its molecules has been obtained. In the case of polyvinyl alcohol an adequate orientation of the molecular structure of the sheet has been obtained if the sheet is extended to from twice to five times its initial length, although under certain circumstances it has been found desirable to increase the orientation by extension of the sheet to as much as eight times its initial length.

Sheets of plastic material of the type described which have been prepared in the manner indicated have also been found useful in connection with the production of dichroic images. Such an image may be produced therein in many ways, one of which, for example, being by printing on the oriented sheet from a relief or similar element coated with or otherwise carrying a dye or stain which renders the sheet dichroic. The oriented sheet of plastic material absorbs the stain over those portions of the sheet coming in contact with the relief, and the degree of absorption is proportional to the intensity of the stain in the relief. It follows that if the relief bears an image, that image will be reproduced as a dichroic image in the oriented plastic sheet.

This invention contemplates the provision of an improved product of the type generally just described, and more specifically it contemplates the provision of an improved plastic sheet for use in the preparation of light-polarizing sheets or dichroic images of the type described and the provision of processes for the manufacture of such a sheet. The product of the present invention may be a transparent sheet or film of plastic material of the type generally described, wherein the molecules at and immediately adjacent one or both of the surfaces are oriented to substantial parallelism.

In one form of the invention, the molecules of one surface of the sheet may be oriented in a direction substantially at right angles to the direction of orientation of the molecules of the other surface of the sheet. Such a product is admirably adapted for use in the production of superimposed, dichroic, stereoscopic prints or images, by reason of the fact that the formation of a dichroic image in each surface of a sheet of the character described as, for example, by following the processes heretofore described in connection with earlier light-polarizing sheets and films, will automatically produce a dichroic image in one surface whose transmission axis is substantially at right angles to the transmission axis of the corresponding stereoscopic dichroic image produced in the other surface of the sheet. It will be understood that with such a sheet the pair of dichroic images may be produced simultaneously by simultaneously printing both surfaces with a suitable dichroic dye or stain.

It will furthermore be understood that with such a sheet no difficulties are encountered arising from expansion or contraction of the various elements carrying the different dichroic prints, for a unitary structure is provided. Laminations are avoided, and the plastic sheet or film is retained in substantially its initial size and shape in its disoriented state. The process of the present invention is one which is adapted for use, as will be shown, in connection with a substantially continuous sheet or film of the material being treated.

The product of the present invention possesses other marked advantages over the products of the prior art. For example, the physical properties of the sheet of the present invention are, generally speaking, to be preferred over those of the prior art sheets. The orientation of the molecules within the body of the sheet results in a decrease in strength of the sheet in a direction at right angles to the direction of the molecular orientation. With the product of the present invention this is avoided, for when the orientation is confined to the surface molecules, it has no appreciable effect upon the physical properties of the body of the sheet.

In the drawings, Fig. 1 represents diagrammatically one form of the invention, comprising a sheet 10 of a linear, high polymeric plastic material the molecules of which have hydroxyl groups, and more specifically a sheet of polyvinyl alcohol the molecules of which are generally heterogeneously oriented. Such a sheet may be formed, for example, by casting or by other methods known to the art. The surface molecules of sheet 10 are illustrated by parallel lines 12 as being oriented to substantial parallelism in the direction indicated by said lines. The orientation of the molecules of the surface may extend downward into the sheet to at least a measurable distance, for example, a distance of approximately .0005 of an inch or less. Such a sheet is adapted to be converted into a light polarizer by staining or dyeing the oriented surface thereof with a dichroic stain or dye such, for example, as a dichroic direct cotton dye, a stain comprising a polarizing periodide, a stain comprising iodine and an iodide, a stain containing a reducible metal such for example as mercury, or with any other suitable dichroic stain or dye. Where polyvinyl alcohol is employed, the stain or dye used may preferably be a water-soluble stain, as such a stain will readily penetrate into the polyvinyl alcohol sheeting.

In the case of polyvinyl alcohol, adequate polarization is obtained if the stain penetrates to a depth in the order of .0002 inch. As a general rule, therefore, it will be sufficient if the orientation penetrates to that depth. Care should be exercised to see that the depth of penetration of the stain is no greater than the depth of orientation of the surface molecules, for if the stain extends into the disoriented body of the sheet itself, that portion will be stained but will not be dichroic. However, since the oriented molecules take the stain much more readily than the unoriented portion of the sheet, it is not difficult to prevent the stain from penetrating too deeply.

While Fig. 1 has been described as illustrating a form of the invention in which the surface molecules of the sheet of polyvinyl alcohol or similar plastic are oriented to substantial parallelism, it is to be understood that the figure may also be deemed illustrative of a polarizer formed from such a product. If the figure is so interpreted, then lines 12 on one surface of sheet 10 may be taken as indicative of the depth of penetration of the polarizing dichroic stain, and the transmission axis of the polarizer will ordinarily be substantially perpendicular to the direction of extension of these lines.

Figure 2:
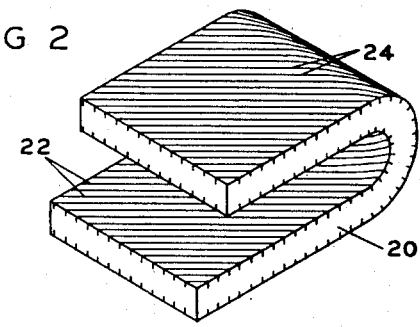
Fig. 2 represents a modification of the invention in which the surface molecules of the sheet have been oriented in directions at substantially 45 degrees to the edges of the sheet, the molecules of one surface of the sheet being oriented in a direction substantially at right angles to the molecules of the other surface of the sheet.

Fig. 2 illustrates a modification of the structure shown in Fig. 1. It will be noted that the direction of orientation of the molecules on the surface of sheet 10 is substantially parallel to its edge, as is indicated by lines 12 in Fig. 1. In Fig. 2, element 20 represents a sheet of polyvinyl alcohol or similar plastic having the molecules on one surface oriented to substantial parallelism in one direction, as indicated by lines 22, and the molecules on the opposite surface oriented in a direction substantially at right angles to the direction of molecular orientation of the first surface, as indicated by lines 24. It will be noted that the molecular orientation of both of these layers is illustrated as at substantially 45 degrees to the long edge of plastic sheet 20. The product shown in Fig. 2 accordingly comprises a plastic sheet having the surface molecules oriented and the central molecules disoriented, and with the direction of orientation of the molecules on one surface being substantially at right angles to that of the molecules on the other surface.

A product such as is shown in Fig. 2 for example is admirably adapted for use in connection with the production of stereoscopic, dichroic, superimposed images. The surface of sheet 20 covered by lines 22 may be printed with a dichroic dye or dyes forming the left-eye image of a stereoscopic pair of images, and the opposite surface, that covered by lines 24, may be printed with a dichroic dye or dyes representing the right-eye image of the stereoscopic pair. Each image will be dichroic, and the transmission axes of the two images will be at right angles to each other. When the images are viewed through suitable analyzers, one analyzer having its transmission axis parallel to the transmission axis of one image and the other analyzer having its transmission axis parallel to the transmission axis of the other image, then one eye of the observer will see one image and the other eye of the observer will see the other image, and a stereoscopic effect will thus be produced.

Another use for the product shown in Fig. 2 is in the preparation of an infra-red filter for photographic or similar purposes. Such a filter may be produced by staining or dyeing both the oriented surfaces of sheet 20 with a neutral dichroic stain or dye having a relatively high density for visible light but which will transmit infra-red radiation. Suitable examples of such dyes include the dichroic direct cotton dyes and polarizing periodide stains mentioned above. It will be seen that if each of the surfaces of sheet 20 is so rendered dichroic, each surface will act to analyze the other by absorbing light transmitted thereby. The net result will be that substantially no visible radiation will be transmitted by the filter but infra-red rays will be transmitted with substantially undiminished intensity.

Figure 3:
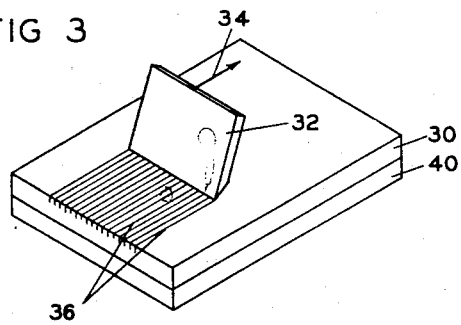
Fig. 3 is a diagrammatic representation of one form of means and method for producing the product of the present invention.

Fig. 3 shows a simple form of apparatus for producing the surface orientation of the molecules such as has hereinbefore been described in connection with Figs. 1 and 2. In Fig. 3, plastic sheet or layer 30 is shown laminated to a supporting plate 40, which may be, for example, a plate of glass or a layer or sheet of other plastic material. It will of course be apparent that the supporting plate is not necessary to the embodiment of the invention, as will be understood from an examination of Figs. 1 and 2. It should, however, be pointed out that any of the products of the present invention may include suitable supporting plates such as that described as at 40.

Element 32 in Fig. 3 represents a scraper element provided with a relatively sharp edge which is pressed into contact with the exposed upper surface of plastic sheet 30 and dragged or scraped across it, as for example in the direction indicated by arrow 34. This shearing action appears to generate local heat through friction at the point of contact between the edge of the scraper and the surface of the sheet. This heat produces softening of the surface material such that layers or filaments thereof appear temporarily to adhere to the scraper and are stretched in the direction of motion thereof to approximately their elastic limit and then pressed down again into the surface of the sheet while still under tension. This results in an orientation of the molecules in the stretched portion similar to the orientation obtained by stretching of the entire sheet, the direction of orientation being parallel to the direction in which the scraper moves across the surface of the sheet, as indicated generally by lines 36. As shown in Fig. 3, this direction may be parallel to the long edges of sheet 30, in which case a product such as that shown in Fig. 1 is produced.

The shape of the edge of scraper 32 is relatively unimportant, and said edge may be sharply angled, rounded, or even flat. Preferably, however, it may be rounded with such a degree of curvature that it has a diameter of approximately one thirty-second of an inch. The scraper element is preferably made of fibre, or wood or other material which is a poor conductor of heat, for the reason that such material has little tendency to absorb the frictional heat generated by the scraping operation and desirable in carrying out the invention. Alternatively, however, said scraper may be made of a heat-conducting material such as steel, but in this event provision should be made for heating it to a temperature at which the surface of the plastic sheet 30 will soften slightly.

During the shearing or rubbing operation scraper element 32 may be pressed down relatively firmly against the surface of sheet 30, as, for example, with a pressure in the neighborhood of 6–10 lb. per linear inch of the scraper edge. It will be understood, furthermore, that repeated scraping may be effected and that improved orientation of the molecular layers adjacent the surface may be obtained by such repeated action, but in many cases adequate orientation is obtained by single scraping action of element 32 on the surface of the sheet.

After the shearing or scraping action is completed, the sheet may be used in any of the ways described above as, for example, for conversion into a polarizer or in the production of dichroic images. However, improved results will be obtained if the sheet is first subjected to heat in order to bond the oriented surface layers more closely to the body of the sheet. This may be effected, for example, by subjecting the sheet to a temperature in the neighborhood of 350 degrees F. for a period of approximately ten seconds.

Figure 4:
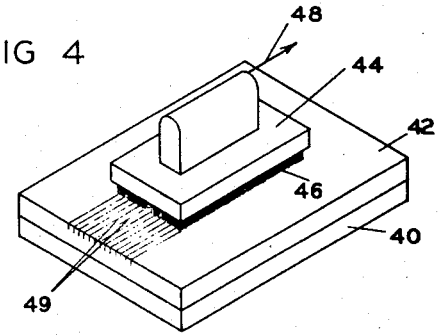
Fig. 4 is a diagrammatic representation of modified means for producing a sheet of the character described.

In Fig. 4 a modified form of apparatus is shown. Here plastic layer 42 is represented as mounted on support 40, which may be dispensed with if desired. Scraper element 32 of Fig. 3 is replaced in the apparatus shown in Fig. 4 by a brush-like element 44 containing a multiplicity of relatively stiff bristles 46. Element 44 is pressed against the exposed surface of plastic sheet 42 and rubbed back and forth over the surface as, for example, in the direction indicated by arrow 48. Where this rubbing action is substantially parallel to the long edge of sheet 42, a structure is produced such as is shown in Fig. 1, wherein the surface and subsurface molecules of the plastic sheet are oriented to substantial parallelism in the direction indicated by lines 49, while the molecules in the main body of plastic sheet 42 retain their initial condition.

Figure 5:
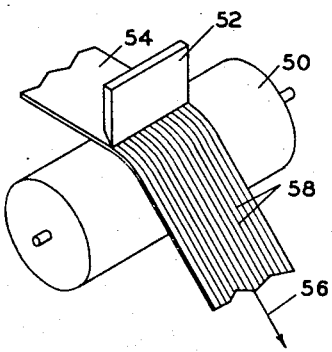
Fig. 5 is a representation of a still further modification of means for producing the product of the invention.

Fig. 5 illustrates different apparatus for accomplishing substantially the same results as are accomplished by the apparatus shown in Figs. 3 and 4. In Fig. 5, roll 50 may, for example, be a rotating steel roll in contact with a scraper tool 52, similar to scraper element 32. Between the scraper and the roll there is passed a sheet 54 of the plastic material to be processed. Scraper 52 may bear against the upper surface of sheet 54 under a fairly light load, for example, a load of approximately six pounds per linear inch or approximately one hundred and ninety pounds per square inch. Under these circumstances if sheet 54 is drawn over roll 50 and beneath scraper 52 in the direction, for example, shown by arrow 56, the surface molecules of sheet 54 will be oriented as the sheet passes beneath the scraper in the direction indicated by lines 58, which is the direction in which the sheet is pulled beneath the scraper element. The sheet should preferably be drawn at a relatively high speed, a preferred example being approximately two hundred and fifty feet per minute. Adequate orientation of the surface molecules of sheet 54 is obtained by a single passage of the sheet beneath scraper element 52 under the conditions outlined. It will be understood that with a device of this kind the orientation of the surface molecules is ordinarily parallel to the long edge of the sheet.

Figure 6:
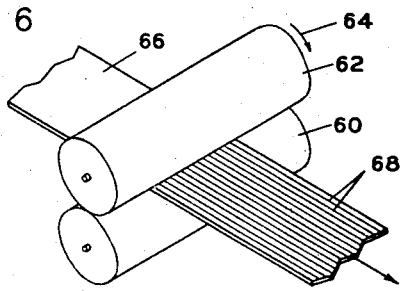
Fig. 6 is a diagrammatic representation of still another modification of the apparatus used to produce the product of the invention.

Fig. 6 illustrates a modified form of apparatus for use in producing the product of the invention. In the device shown in this figure, rolls 60 and 62 may, for example, be of rubber, metal, glass or the like. Roll 60 may be an idler roll and roll 62 a driven roll, being driven for example in the direction illustrated by arrow 64. The sheet 66 of plastic material to be acted upon is drawn rapidly between the rolls and preferably in a direction against the direction of rotation of roll 62. Alternatively, both of rolls 60 and 62 may be fixed, and sheet 66 may be drawn therebetween, in which event the molecules on both surfaces of said sheet may be oriented simultaneously. As a result, the surface molecules and the molecules of the layers immediately adjacent that surface of the sheet which comes in contact with roll 62 are substantially oriented in the direction shown, for example, by lines 68.

Figs. 5 and 6 illustrate examples of the invention in which the layer of plastic acted upon is free from a support, and Figs. 3 and 4 illustrate examples of the invention in which the plastic layer is bonded to a supporting plate. It is to be understood that the apparatus shown in Figs. 3 and 4 may be used irrespective of the presence of the support, and the apparatus shown in Figs. 5 and 6 is equally adapted for use with a support. Speaking generally, a support is not necessary unless the layer of polyvinyl alcohol or other resin being acted upon is exceedingly thin, in which case it may be desirable to bond it to a suitable support such, for example, as a sheet of a plastic material such as cellulose acetate or the like. The support may be rigid as in the case of glass, or flexible as in the case of the plastic materials mentioned.

Figure 7:
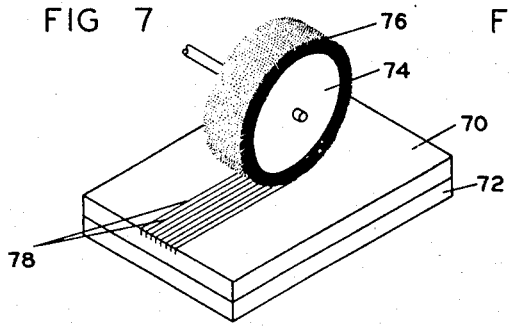
Fig. 7 is a diagrammatic representation of a further modified form of apparatus comprising a rapidly rotating brush or disc which is brought into contact with the surface the molecules of which are to be oriented.

In Fig. 7 there is shown a further modified form of apparatus for obtaining the product of the present invention. Here a plastic sheet 70 is shown affixed to a supporting plate 72, and a rapidly rotating wheel or disc 74 is brought into contact with its exposed surface. This wheel or disc may take any of a great variety of forms. In the form shown in Fig. 7, disc 74 is provided on its outer surface with a multiplicity of relatively stiff, wire-like bristles 76. The rotating disc or wheel 74 is caused to travel back and forth relatively to the surface of sheet 70 until the entire exposed surface of the sheet has been processed. As the disc rotates against the sheet, an orientation of the surface molecules and the molecules immediately adjacent the surface is effected, which orientation may be in the direction of rotation of the disc, as indicated by lines 78.

Figure 8:
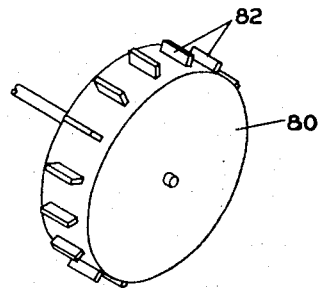

Figs. 8 to 11 inclusive illustrate modified forms of discs or wheels which may be used in lieu of the device shown at 74 in Fig. 7. In Fig. 8 for example wheel 80 is provided with outwardly extending flaps or scraper blades 82 of any of the materials mentioned above, which are brought into contact with the exposed surface of the plastic film or sheet to effect orientation of its surface molecules.

In Fig. 9, the rotating wheel or disc 90 is provided with similarly outwardly extending blades or scaper elements 92 which, however, are here shown as angularly positioned with respect to the surface of the wheel or disc so that the scraping action across the sheet is in a direction more nearly parallel to the length of said scraper elements than in the device shown in Fig. 8.

In Fig. 10, the rotating wheel or disc 100 is provided with a plurality of outwardly extending, weighted roller elements 102 which are mounted pivotally adjacent the periphery of wheel 100 as at 104, so that as said wheel rotates, weighted rolls 102 are thrown outward by centrifugal force. As these rolls are brought into contact with the surface of a sheet of plastic of the character described, the surface molecules of the sheet are oriented as in the other modifications described.

In Fig. 11 a device is shown in which wheel or disc 110 is provided with a plurality of outwardly extending peg elements 112 which act much as do weighted rolls 102 described in connection with Fig. 10.

Fig. 12 illustrates somewhat diagrammatically a modification of the device shown in Fig. 7. In Fig. 7 wheel 74 is illustrated as being rotated against the upper surface of a flat sheet 70 and as being moved relatively to the surface of the sheet until its entire surface has been covered. In Fig. 12 there is shown a somewhat similar apparatus comprising a wheel 120 provided with outwardly extending, stiff, wirelike bristle elements 122 of the type shown at 76 in Fig. 7. In the apparatus shown in Fig. 12, however, the plastic sheet which is to be operated on and which is shown at 124 is caused to be brought into contact with the rotating surface of wheel 120 by drawing the sheet across the wheel in the direction shown for example by arrow 126. With such an arrangement the sheet or film of plastic may conform throughout its width or through a portion of its width to the curved periphery of wheel 120. It will be understood that the direction in which sheet 124 is drawn across the periphery of wheel 120 may be at right angles to the direction of rotation of the wheel or at any desired angle thereto. The surface of the sheet which comes in contact with the periphery of the wheel has its molecules oriented as indicated, for example, by lines 126 in Fig. 12.

The direction of molecular orientation obtained with the apparatus shown in Fig. 12 will be generally in the direction of rotation of wheel 120. It has been found, however, with apparatus of this type that the speed of rotation of the wheel, the speed of travel of the sheet across the periphery of the wheel, and the angle at which the sheet is brought into contact with the periphery of the wheel are all important elements in determining the direction of orientation of the molecules in that surface of the sheet which is brought into contact with the wheel. Thus if the sheet is caused to travel rapidly across the surface of the wheel, the direction of orientation of the molecules will not be parallel to the direction of rotation of the wheel against the sheet. If the direction of rotation of the wheel or disc or other scraper element is not parallel to the direction of travel of the film or sheet of plastic material past the rotating element, the direction of orientation of the molecules on the treated surface of the sheet is ordinarily in a direction which is non-parallel both to the direction of rotation of the wheel and to the direction of travel of the sheet. The faster the sheet travels past the edge of the rotating wheel, the more nearly the direction of orientation of the molecules approximates the direction of travel of the sheet.

It should be understood that while the devices discussed in connection with the description of Figs. 3 to 11 have been described as acting upon a sheet which travels past the device in a direction at right angles to the edge of the device, many of these devices are adapted for use in the manner shown in Fig. 12, where the direction of travel of the sheet past the device may be either parallel, perpendicular, or at any desired oblique angle to the direction of rotation of the disc or wheel acting upon the surface of the sheet.

In Fig. 13, there are shown four forms of solid discs or wheels which may be used in the practice of the methods described in connection with Fig. 12. Said discs or wheels may be made of two different types of material. One such type comprises materials of low heat conductivity such, for example, as Bakelite or other resins or hard plastics, or wood, or fibre, which do not tend to absorb the heat generated by their frictional contact with the surface of the sheet to be oriented. Alternatively, said discs or wheels may be made of steel or other suitable metals, but in such case the wheel is preferably heated in order to prevent it from too rapidly conducting away the heat of friction. Either of these alternatives appears to give highly satisfactory results.

The operative edge of the wheel or disc of one of the above materials is preferably smooth as much as possible to avoid scratches and irregularities in the surface of the treated film. Said edge may, as is shown in Fig. 13 at 130, be rounded, or it may, as is shown at 132, be trimmed to a relatively sharp and pointed edge, or it may, as is shown at 134, be formed as a rounded edge of very small radius, or it may, as is shown at 136, be flat. In each of these diagrammatic representations, element 138 represents the plastic sheet. Using a disc or wheel of the type shown generally in Fig. 13 and more specifically at 134 in Fig. 13, and passing over it a sheet of plastic material as is shown, for example, in Fig. 12, it has been found that a very wide range of speeds of tool and of sheet traverse are possible. So also, the plastic sheet may be pressed against the edge of the rotating tool or disc within a wide pressure range. Too high a tool speed is to be avoided, for it has been found that if the tool edge is moving at too high a speed relatively to the speed of travel of the sheet past the tool, an uneven orientation of the surface molecules is obtained. If the tool edge is moving at too low a speed of travel of the sheet past the tool, an unsatisfactory orientation of the molecules is obtained, i. e., the orientation which is obtained is neither efficient nor adequate. Merely as representative of the speed which may be employed in the practice of the invention, it may be stated that a speed of tool edge past the sheet of one thousand feet per minute has been found satisfactory where the speed of travel of the sheet past the tool is approximately sixty feet per minute under a pressure between the sheet and the tool of about five pounds per linear inch. Speaking generally, better results have been obtained by passing the sheets of the plastic material over the edge of a fixed rotating disc or tool as illustrated in Fig. 12 than by moving the rotating or other tool element over the surface of a fixedly positioned plastic sheet as in the manner illustrated in Figs. 3, 4 and 7.

Fig. 14 illustrates diagrammatically a preferred form of device for use in producing the product of the present invention. In this form of apparatus a sheet of plastic 140 is caused to pass over the exposed edge of a continuous belt 142 of fibre, Bakelite, steel or other suitable material. The operative edge of the belt may be shaped to conform to any of the structures shown in Fig. 13 and more specifically to the structure shown at 134 in Fig. 13. In order to avoid irregularities, scratches and the like in the exposed edge of belt 142, it may be coated with a hard, resinous composition such, for example, as the material sold under the trade name "Polymerin."

Belt 142 is shown as passing about a plurality of pulley elements 144 and 146, one of which may be a driving pulley and the other an idler pulley. Arrows 148 are representative of the direction of rotation of pulleys 144 and 146. A support 150 may be provided beneath that portion of belt 142 which is brought into contact with sheet 140. This will prevent sagging of the belt and will insure its remaining in a flat position so that as it is dragged or moved across the surface of plastic sheet 140 it will remain in close contact with the entire width of the sheet as the latter is drawn in flat condition over its exposed upper edge, as, for example, in the direction indicated by arrow 152. It will be understood that this direction need not be at right angles to the direction of travel of the belt but may be at any desired angle thereto. The molecules of that surface of sheet 140 in contact with the belt are oriented as the sheet is drawn over the edge of the rapidly moving belt, the direction of orientation being illustrated in Fig. 14 by lines 154. As has been previously pointed out, this direction of orientation will not be absolutely parallel to the direction of movement of the belt, but will be in a direction at an angle to the direction of movement of the belt, the angle depending upon the belt's speed, the speed of motion of the sheet across the exposed edge of the belt, and the angle between the directions of motion of the sheet and the belt.

In all of the embodiments of the invention shown and described, the plastic sheet may be acted upon while it is hard and dry, or it may be softened slightly, as for example by including a plasticizer therein or by subjecting the sheet to relatively mild heat. As has been pointed out, if the scraper element comprises material which is a poor conductor of heat, the orientation of the molecules is facilitated in part by a local generation of heat through friction which softens the surface of the sheet at the point of contact between it and the scraper element. If the scraper element is of heat-conducting material, then it may be necessary to apply additional heat thereto in order to effect adequate softening of the surface of the plastic sheet during the instant in which the scraper element is in contact with it. This may be done, if the scraper element is metallic, by providing means for maintaining it at a predetermined suitable temperature, as, for example, in the modification of the invention shown in Fig. 14 wherein belt 142 is of steel or other metal, by causing said belt to pass through or adjacent one or more electrically heated units 155. Alternatively, the surface of the sheet may first be softened by the application thereto of a suitable solvent or swelling agent such, for example, as water or steam.

In any of the above cases, care should be exercised to prevent the entire plastic sheet from softening, and the softened portion should preferably be limited to only the molecular layers immediately adjacent the surface being acted upon by the tool or scraper. The plastic sheet itself, which as will be understood is thermoplastic, should remain at such a temperature that substantially no stretch or permanent distortion is imparted thereto by the orienting operation. Undesirable overheating may be prevented, for example, by providing cooling means such as an air jet adjacent the point of contact between the sheet and the scraper element, as is indicated at 156 in Fig. 14. Furthermore, it has been found that where the scraper element moves slowly past the sheet and where a somewhat excessive local heat is generated, the sheet tends to stick to the scraper element, filaments of the sheet being pulled off and remaining in contact with the scraper. This should be avoided by passing the scraper rapidly across the surface and by moving the sheet which is being treated fairly rapidly past the scraper element, examples of suitable speeds having already been given. In all of the above cases, it is to be understood that the sheet will preferably be subjected to the final step of baking to secure adequate bonding between the oriented and unoriented portions of the sheet.

While most of the devices for producing the product of the invention have been shown as acting upon only one surface of the plastic sheet, it is to be understood that both surfaces of the sheet may be oriented either by passing the sheet twice over the device illustrated, once with one surface against the scraper tool or element and the second time with the other surface of the sheet against the scraper tool or element, or a plurality of scraper tools may be employed, one positioned to effect substantial orientation of the molecules of one surface of the sheet and the other positioned to effect substantial orientation of the molecules of the opposite surface of the sheet. So also, it is to be understood that where the surface molecules of the sheet have been oriented on each of the exposed surfaces, the orientation of the molecules on one surface may be substantially parallel, perpendicular, or at any desired angle to the direction of orientation of the molecules on the opposite surface of the sheet. Devices for accomplishing these purposes are all among those shown and described.

After the molecules of one or both surfaces of the plastic sheet have been oriented to substantial parallelism, it may be desirable to buff the oriented surfaces so as to impart a high, glossy finish thereto. Apparatus for accomplishing this result is shown in Fig. 15, where plastic sheet 160 is represented as having the molecules on one surface oriented to substantial parallelism, as indicated by lines 162. In the form shown in Fig. 15, the orientation of the surface molecules is indicated as in a direction at angles of substantially 45 degrees to the long edges of the sheet. Element 164 represents a buffer such, for example, as a felt disc or wheel, the periphery of which may be either smooth or notched in any desired form. When such a wheel is caused to rotate in contact with the treated surface of sheet 160, it imparts a high, glossy finish thereto. Frequently it has been found that the orienting process imparts a matte surface to the sheet, and this may be eliminated and a glossy surface secured by using a buffer in the manner described. Preferably the buffer should rotate at an angle nonparallel to the direction of orientation of the molecules in the sheet. It has been found that when this is done, no appreciable loss of orientation occurs and minute irregularities in the surface structure are more easily smoothed out.

The operation of the devices and the process for producing the desired product will, it is thought, be clearly understood from the foregoing description. One or both surfaces of a plastic sheet, and more particularly an organic, transparent, linear, high polymeric plastic material, the molecules of which contain hydroxyl groups, may be subjected to a shearing or rubbing force, as by being brought into contact with a scraper tool or rotating or moving element under such conditions of pressure and tool and sheet speed that the layers of plastic material adjacent the surfaces of the sheet are extended, for example, to substantially their elastic limit and the molecules therein thus oriented to substantial parallelism. The depth of the oriented portion may be controlled, and under the conditions described in connection with the apparatus shown in the drawings, it may be in the neighborhood of .0005 inch, or less.

The product so produced, comprising a plastic sheet the main body of which has its molecules disoriented but one or more surfaces of which have their molecules oriented to substantial parallelism, as has been pointed out, is admirably adapted for conversion into a light-polarizing element or into a sheet bearing one or a pair of dichroic images.

Throughout the description the main body of the sheet material treated in accordance with the invention has been described as having its molecules heterogeneously oriented or disoriented. It should be pointed out, however, that it is not essential to the invention that the molecules throughout the inner portion of the sheet be in such a state of heterogeneous orientation. On the contrary, it is possible, within the scope of the invention, first to orient the molecules throughout the body of the sheet in a predetermined direction, as by stretching of the sheet, and then to orient the molecules on one or both surfaces of the sheet at an angle to the direction of molecular orientation throughout the body thereof. For example, a sheet of polyvinyl alcohol may first be subjected to a slight preliminary stretch such that it is rendered birefringent and with such a degree of birefringence that it will function substantially as a quarter-wave retardation plate. The molecules on one surface of the sheet may then be oriented by any of the above described devices or methods in a direction at 45 degrees to the direction of molecular orientation within the body of the sheet, and the oriented portion may be converted into a light polarizer as by staining. The resulting product will then be found capable of functioning as a circular polarizer, inasmuch as it comprises a light-polarizing surface in combination with a quarter-wave plate having its axis at 45 degrees to the axis of the polarizer.

It will be apparent, moreover, that many such modifications of the invention may be produced without departing from the scope of the invention. For example, a quarter-wave retardation device or other fractional wave retardation devices may be produced from a sheet of unoriented plastic material of the type described by subjecting it to the process of the present invention under such conditions that the oriented surface layers of the plastic possess the desired birefringence to accomplish the predetermined fractional wave retardation when the sheet is properly positioned in the path of a beam of polarized light.

So also, the sheet of plastic material which is to be treated in acordance with the process of the present invention may be preliminarily stretched so that it is rendered birefringent. It may then be subjected to the scraping or rubbing action described in connection with the apparatus shown in the drawings so that the surface layers adjacent one surface of the sheet are oriented to substantial parallelism in a direction other than the direction of stretch to which the sheet was first subjected. The surface layers may then be dyed or stained or otherwise treated to be rendered light-polarizing, and the resulting product will be a unitary sheet of a thin light-polarizing layer or film and a birefringent layer, the polarizing axis of the polarizing layer being angularly positioned with respect to the principal optical direction of the birefringent layer. Such a sheet is admirably adapted for use in connection with advertising display devices and the like where color is produced by passing a beam of light through two light-polarizing elements which have a birefringent sheet positioned between them. It is of course to be understood that in connection with such a product a supplemental light polarizer would be employed. Generally speaking, this supplemental light polarizer would comprise preferably a separate element which might be rotated or otherwise moved with respect to the composite polarizing and birefringent elements described. Under certain circumstances, however, it might be desirable to orient the surface molecules of both surfaces of the stretched birefringent plastic layer and convert both surfaces into light-polarizing layers, the polarizing axes of these layers being angularly positioned with respect to the principal optical direction of the intermediate birefringent layer. Such a unitary structure would give a predetermined color to a transmitted beam incident normally on either face and a different predetermined color to transmitted light incident at angles to the normal on either face.

Where the product of the present invention comprises a unitary sheet consisting of a birefringent portion and a light-polarizing layer or film as described above, the exposed surface of the birefringent portion may be treated as for example by a solvent to release the strains or stresses set up in the sheet in rendering it birefringent and thus to produce predetermined designs in the sheet when viewed in polarized light through a suitable analyzer. All such products are to be deemed to be included within the scope of the present invention.

Furthermore, as has been pointed out, it is possible to bond to a plastic base, such for example as a sheet of cellulose acetate, a layer or film of the plastic material which is to be subjected to the process of the present invention. Such a material, as has been noted, is preferably polyvinyl alcohol. The composite sheet comprising the cellulose acetate or other plastic base with a thin coating or film of polyvinyl alcohol bonded thereto is then subjected to the process of the present invention to substantially orient the surface molecules of the exposed surface of the polyvinyl alcohol layer or film. Such a composite device may be preferred in many instances for it is thus possible to obtain the advantage of the physical properties of one material, for example cellulose acetate, and the easy orienting properties of another plastic, for example polyvinyl alcohol. Furthermore, where such a polarizer is employed in the production of a light polarizer, the composite sheet may be preferred, for the dyeing or staining of the polyvinyl alcohol produces a highly efficient polarizer, and the cellulose acetate backing may act to prevent distortion such as curling or the like of the finished polarizing sheet. Figs. 3 and 4 for example may be deemed illustrative of a composite sheet of a plurality of plastics, 140 being selected because of preferred physical properties and the other, 32 in Fig. 3 and 42 in Fig. 4 being selected because of its ease in handling in the present invention and the ease with which it may be converted into a light-polarizing film.

While polyvinyl alcohol is a preferred plastic material it is to be understood that other materials falling within the defined preferred class of plastics, i. e., the linear, high polymeric plastics, the molecules of which have hydroxyl groups, may also be employed to advantage where a light polarizer is to be formed. For example, a sheet of cellulose acetate has been treated so as to convent one or both surfaces of the sheet to cellulose and the sheet has then been processed in accordance with the teachings of the invention to orient the molecules on the treated surface or surfaces. The resulting product is one which may be converted into a light polarizer in the manner described by staining for example with a dichroic dye or stain.

It may be pointed out that the product of the invention in one form comprises an isotropic sheet of an organic plastic the surface molecules of which on one or both surfaces have been so oriented as to convert the surface layers of the plastic into birefringent layers.

It is also to be understood that the orienting of the surface molecules of the sheet may if desired be supplemented by a pre-orientation in the same direction but in a lesser degree of the entire sheet, for example by stretching the plastic sheet in the direction in which the surface molecules are to be thereafter oriented. All such modifications of the invention are to be deemed to fall within its scope.

It should further be pointed out that it is not essential to the invention that the direction of molecular orientation imparted to the surface of the sheet be uniform over the entire area thereof. For example under some conditions it may be desirable to orient adjacent portions of the surface of a sheet at predetermined angles to each other, as for example in contiguous bands whose directions of molecular orientation are at predetermined angles to the direction of molecular orientation of adjacent bands. In another example it may be desirable to cause the direction of orientation to vary predeterminedly along the surface of the sheet, as for example in a curve such as a sinusoidal curve. Any and all such modifications of the process and product of the invention are to be understood as coming within the scope thereof.

Since certain changes in carrying out the above process, and certain modifications in the article which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. As a new article of manufacture, a structurally integral, initially substantially homogeneous sheet of material from the class consisting of the transparent, linear, high polymeric plastics, the molecules throughout the central portion of said sheet being substantially disoriented, and a plurality of portions of said sheet, each portion including one surface of said sheet, having the molecules thereof substantially oriented to an appreciable depth.

2. As a new article of manufacture, a structurally integral, initially substantially homogeneout sheet of material from the class consisting of the transparent, linear, high polymeric plastics, the molecules of which contain hydroxyl groups, the molecules throughout the central portion of said sheet being substantially disoriented and both surfaces of said sheet and the portions immediately adjacent thereto having the molecules thereof substantially oriented to an appreciable depth, the corresponding directions of molecular orientation of said surface portions being substantially perpendicular.

3. As a new article of manufacture, a structurally integral, initially substantially homogeneous sheet of material from the class consisting of the transparent, linear, high polymeric plastics, the molecules of which contain hydroxyl groups, the molecules throughout the central portion of said sheet being substantially disoriented, and the molecules throughout at least a portion of said sheet of a thickness of approximately .0002 inch, and including one surface thereof, being substantially oriented.

4. As a new article of manufacture, a structurally integral, initially substantially homogeneous sheet of polyvinyl alcohol, the molecules throughout the central portion of said sheet being substantially disoriented, and the molecules throughout both surfaces of said sheet and the portions thereof immediately adjacent said surfaces being substantially oriented to an appreciable depth, the corresponding directions of molecular orientation of said surface portions being substantially perpendicular.

5. As a new article of manufacture, a structurally integral, initially substantially homogeneous sheet of polyvinyl alcohol, the molecules throughout the central portion of said sheet being substantially disoriented and the molecules throughout at least a portion of said sheet of a thickness of approximately .0002 inch, and including one surface thereof, being substantially oriented.

6. As a new article of manufacture, a structurally integral, initially substantially homogeneous sheet of material from the class consisting of the transparent, linear, high polymeric plastics, the molecules throughout the central portion of said sheet being heterogeneously disoriented and the molecules on and adjacent at least one surface of said sheet being oriented to substantial parallelism to an appreciable depth.

7. As a new article of manufacture, a structurally integral, initially substantially homogeneous sheet of material from the class consisting of the transparent, linear, high polymeric plastics, the molecules throughout the central portion of said sheet being heterogeneously disoriented and the molecules on and adjacent at least one surface of said sheet being oriented to substantial parallelism to an appreciable depth, the direction of orientation of said molecules being at a predetermined angle to an edge of said sheet.

8. As a new article of manufacture, a structurally integral, initially substantially homogeneous sheet of material from the class consisting of the transparent, linear, high polymeric plastics, the molecules of which contain hydroxyl groups, the molecules throughout the central portion of said sheet being heterogeneously disoriented and the molecules on and adjacent at least one surface of said sheet being oriented to substantial parallelism to an appreciable depth, the direction of orientation of said molecules being at an angle of approximately 45 degrees to an edge of said sheet.

9. As a new article of manufacture, a structurally integral, initially substantially homogeneous, sheet of material from the class consisting of the transparent, linear, high polymeric plastics, the molecules of which contain hydroxyl groups, the molecules throughout the central portion of said sheet being heterogeneously disoriented, the molecules on and adjacent both surfaces of said sheet being oriented so that the molecules on and adjacent one surface are oriented in a direction substantially perpendicular to the direction of orientation of the molecules on and adjacent the other said surface, each oriented layer of molecules being of a thickness of at least .00015 inch.

10. As a new article of manufacture, a structurally integral, initially substantially homogeneous sheet of material from the class consisting of the transparent, linear, high polymeric plastics, the molecules of which contain hydroxyl groups, the molecules throughout the central portion of said sheet being heterogeneously disoriented, the molecules on and adjacent both surfaces of said sheet being oriented so that the molecules on and adjacent one surface are oriented in a direction substantially perpendicular to the direction of orientation of the molecules on and adjacent the other said surface, each oriented layer of molecules being of a thickness of at least .00015 inch, the directions of orientation of said molecular layers being substantially at angles of 45 degrees to a predetermined edge of said sheet.

11. As a new article of manufacture, a structurally integral, initially substantially homogeneous sheet of polyvinyl alcohol, the molecules throughout the central portion of said sheet being heterogeneously disoriented and the molecules on and adjacent at least one surface of said sheet being oriented to substantial parallelism to an appreciable depth.

12. As a new article of manufacture, a structurally integral, initially substantially homogeneous sheet of polyvinyl alcohol, the molecules throughout the central portion of said sheet being heterogeneously disoriented, the molecules on and adjacent both surfaces of said sheet being oriented so that the molecules on and adjacent one surface are oriented in a direction substantially perpendicular to the direction of orientation of the molecules on and adjacent the other said surface, each oriented layer of molecules being of a thickness of at least .00015 inch.

13. As a new article of manufacture, a structurally integral, initially substantially homogeneous sheet of material from the class consisting of the transparent, linear, high polymeric plastics, the molecules of said sheet being predeterminedly oriented, with the molecules thereof on and adjacent one surface of said sheet being differently oriented from the molecules of the remainder of the sheet, said layer of differently oriented molecules being of a thickness of at least .00015 inch.

14. As a new article of manufacture, a structurally integral, initially substantially homogeneous sheet of polyvinyl alcohol, the molecules of said sheet being predeterminedly oriented with the molecules thereof on and adjacent at least one surface of said sheet being differently oriented from the molecules of the remainder of the sheet, said layer of differently oriented molecules being of a thickness of at least .00015 inch.

15. As a new article of manufacture, a structurally integral, initially substantially homogeneous sheet of material from the class consisting of the transparent, linear, high polymeric plastics, the molecules of which contain hydroxyl groups, the molecules on and immediately adjacent one surface of said sheet being oriented to substantial parallelism, the molecules of the remaining portion of said sheet being oriented over certain areas to substantially parallelism in a different direction from the direction of orientation of said surface layer of molecules and over other predetermined areas of said sheet being still differently oriented.

16. As a new article of manufacture, a structurally integral, initially substantially homogeneous sheet of a transparent, linear, high polymeric plastic, a layer of said sheet including one surface thereof comprising a multiplicity of filaments of said plastic, the molecules of each of said filaments being oriented in substantial parallelism, said filaments being oriented to substantial parallelism and coheres together and to the body of said sheet under tension, the molecules throughout the central portion of said sheet being in a different state of orientation from the molecules of said surface layer.

17. As a new article of manufacture, a structurally integral, initially substantially homogeneous sheet of a transparent, linear, high polymeric plastic, a layer adjacent and including each surface of said sheet comprising a multiplicity of filaments of said plastic, the molecules of each of said filaments being oriented in substantial paralellism, said filaments being oriented to substantial parallelism and cohered together and to the body of said sheet under tension, said surface layers being separated by an inner portion of said sheet wherein the molecules are heterogeneously oriented.

18. As a new article of manufacture, a structurally integral, initially substantially homogeneous sheet of a transparent, linear, high polymeric plastic, a layer adjacent and including each surface of said sheet comprising a multiplicity of filaments of said plastic, the molecules of each of said filaments being oriented in substantial parallelism, said filaments being oriented to substantial parallelism and cohered together and to the body of said sheet under tension, said surface layers being separated by an inner portion of said sheet wherein the molecules are heterogeneously oriented, the molecules in said surface layers being oriented substantially perpendicularly.

19. As a new article of manufacture, a structurally integral, initially substantially homogeneous sheet of polyvinyl alcohol having a surface layer comprising a multiplicity of filaments of said plastic, the molecules of each of said filaments being oriented in substantial parallelism, said filaments being oriented to substantial parallelism and cohered together and to the body of said sheet under tension, the molecules throughout the central portion of said sheet being in a different state of orientation from the molecules of said surface layer.

20. As a new article of manufacture, a structurally integral, initially substantially homogeneous sheet of polyvinyl alcohol having a plurality of surface layers, each of said layers comprising a multiplicity of filaments of said plastic, the molecules of each of said filaments being oriented in substantial parallelism, said filaments being oriented to substantial parallelism and cohered together and to the body of said sheet under tension, said surface layers being separated by an inner portion of said sheet wherein the molecules are heterogeneously oriented.

21. A light polarizer comprising a structurally integral, initially substantially homogeneous sheet of a transparent, linear, high polymeric plastic the molecules of which contain hydroxyl groups, the molecules on and adjacent at least one surface of said sheet being oriented to substantial parallelism, the molecules throughout the remainder of said sheet being substantially disoriented, said oriented portion having a dichroic dye incorporated therein.

22. A light polarizer comprising a structurally integral, initially substantially homogeneous sheet of a transparent, linear, high polymeric plastic the molecules of which contain hydroxyl groups, the molecules on and adjacent one surface of said sheet being substantially oriented, the molecules on and adjacent the other surface of said sheet being substantially oriented in a direction substantially perpendicular to the direction of molecular orientation on the first named surface, said oriented surfaces being separated by an inner portion wherein the molecules are substantially disoriented, predetermined portions at least of each said oriented surface having a dichroic dye incorporated therein.

23. A light polarizer comprising a structurally integral, initially substantially homogeneous sheet of polyvinyl alcohol having the molecules on and adjacent one surface of said sheet substantially oriented, the molecules throughout the remainder of said sheet being substantially disoriented, said oriented portion of said sheet having a dichroic dye incorporated therewith.

24. A light polarizer comprising a structurally integral, initially substantially homogeneous sheet of polyvinyl alcohol having the molecules on and adjacent one surface of said sheet substantially oriented, the molecules on and adjacent the other surface of said sheet being substantially oriented in a direction substantially parallel to the direction of molecular orientation adjacent the first named surface, said oriented surfaces being separated by an inner portion wherein the molecules are substantially disoriented, said molecularly oriented portions having a dichroic dye incorporated therewith.

25. An article of manufacture comprising a structurally integral, initially substantially homogeneous sheet of a transparent, linear, high polymeric plastic the molecules of which contain hydroxyl groups, the molecules on and adjacent at least one surface of said sheet being substantially oriented, the molecules throughout the remainder of said sheet being substantially disoriented, predetermined areas of said oriented portion having at least one dichroic dye differentially absorbed therein, said areas forming in combination a predetermined image, said image showing maximum contrast in polarized light vibrating parallel to the direction of said molecular orientation.

26. As a new article of manufacture, a structurally integral, initially substantially homogeneous sheet of material from the class consisting of the transparent, linear, high polymeric plastics, the molecules of which contain hydroxyl groups, the molecules throughout the central portion of said sheet being heterogeneously disoriented, the molecules on and adjacent both surfaces of said sheet being oriented so that the molecules on and adjacent one surface are oriented in a direction substantially perpendicular to the direction of orientation of the molecules on and adjacent the other said surface, predetermined areas of one of said oriented portions having at least one dichroic dye differentially absorbed therein, said areas forming in combination a predetermined image, predetermined areas of the other said oriented portion having at least one dichroic dye differentially absorbed therein and forming in combination a second predetermined image, said images being respectively right and left eye stereoscopic images.

27. An infra red filter comprising a structurally integral, initially substantially homogeneous sheet of a transparent, linear, high polymeric plastic the molecules of which contain hydroxyl groups, the molecules adjacent one surface of said sheet being oriented to substantial parallelism, the molecules adjacent the other surface of said sheet being substantially oriented in a direction substantially perpendicular to the direction of molecular orientation adjacent the first named surface, said oriented portions being separated by an inner portion wherein the molecules are substantially disoriented, each of said oriented portions having incorporated therewith a substantially neutral dichroic dye having a relatively high density for visible light but transmitting infra red radiation.

28. A process of the character described comprising softening a surface layer of an initially substantially homogeneous sheet of an organic plastic having asymmetric molecules to render orientable the molecules of said layer, said layer being relatively thin in comparison with the total thickness of said sheet, and orienting the molecules of said softened layer by applying thereto a mechanical force to which said molecules are responsive, said orienting force being applied only to said softened layer and leaving substantially unaffected the orientation of the molecules throughout the remainder of said sheet.

29. A process of the character described comprising softening a surface layer of an initially substantially homogeneous sheet of an organic plastic having asymmetric molecules to render orientable the molecules of said layer, said layer being relatively thin in comparison with the total thickness of said sheet, and orienting the molecules of said softened layer by applying thereto a mechanical force to which said molecules are responsive, said orienting force being applied only to said softened layer and leaving substantially unaffected the orientation of the molecules throughout the remainder of said sheet, and hardening said layer to hold said molecules in oriented position.

30. A process of the character described comprising heating a surface layer of an initially substantially homogeneous sheet of an organic plastic having asymmetric molecules to soften said layer and render orientable the molecules therein, said layer being relatively thin in comparison with the total thickness of said sheet, orienting the molecules of said softened layer by applying thereto a mechanical force to which said molecules are responsive, said orienting force being applied only to said softened layer and leaving substantially unaffected the orientation of the molecules throughout the remainder of said sheet, and hardening said layer by cooling said layer to hold said molecules in oriented position.

31. A process of the character described comprising softening a surface layer of an initially substantially homogeneous sheet of an organic plastic having asymmetric molecules to render orientable the molecules of said layer, said layer being relatively thin in comparison with the total thickness of said sheet, and simultaneously orienting the molecules of said softened layer by applying thereto a mechanical force to which said molecules are responsive, said orienting force being applied only to said softened layer and leaving substantially unaffected the orientation of the molecules throughout the remainder of said sheet.

32. A process of the character described comprising heating a surface layer of an initially substantially homogeneous sheet of an organic plastic having asymmetric molecules to soften said layer and render orientable the molecules therein, said layer being relatively thin in comparison with the total thickness of said sheet, and simultaneously orienting the molecules of said softened layer by applying thereto a mechanical force to which said molecules are responsive, said orienting force being applied only to said softened layer and leaving substantially unaffected the orientation of the molecules throughout the remainder of said sheet.

33. A process of the character described comprising softening a surface layer of an initially substantially homogeneous sheet of an organic plastic having asymmetric molecules to render orientable the molecules of said layer, said layer being relatively thin in comparison with the total thickness of said sheet and orienting the molecules of said softened layer by applying thereto a shearing force, said orienting force being applied only to said softened layer and leaving substantially unaffected the orientation of the molecules throughout the remainder of said sheet.

34. A process of the character described comprising softening a surface layer of an initially substantially homogeneous sheet of an organic plastic having asymmetric molecules to a depth in the order of .0002 inch to render orientable the molecules of said layer, said layer being relatively thin in comparison with the total thickness of said sheet, and orienting the molecules of said softened layer by applying thereto a mechanical force to which said molecules are responsive, said orienting force being applied only to said softened layer and leaving substantially unaffected the orientation of the molecules throughout the remainder of said sheet.

35. A process of the character described comprising softening a surface layer of an initially substantially homogeneous sheet of polyvinyl alcohol to render orientable the molecules of said layer, said layer being relatively thin in comparison with the total thickness of said sheet, and orienting the molecules of said softened layer by applying thereto a mechanical force to which said molecules are responsive, said orienting force being applied only to said softened layer and leaving substantially unaffected the orientation of the molecules throughout the remainder of said sheet.

36. A process of the character described comprising heating a surface layer of an initially substantially homogeneous sheet of polyvinyl alcohol to soften said layer and render orientable the molecules therein, said layer being relatively thin in comparison with the total thickness of said sheet, simultaneously orienting the molecules of said softened layer by applying thereto a mechanical force to which said molecules are responsive, said orienting force being applied only to said softened layer and leaving substantially unaffected the orientation of the molecules throughout the remainder of said sheet, and hardening said layer by cooling to hold said molecules in oriented position.

37. A process of the character described comprising applying a swelling agent to a surface layer of an initially substantially homogeneous sheet of an organic plastic having asymmetric molecules to soften said layer and render orientable the molecules therein, said layer being relatively thin in comparison with the total thickness of said sheet, orienting the molecules of said softened layer by applying thereto a mechanical force to which said molecules are responsive, said orienting force being applied only to said softened layer and leaving substantially unaffected the orientation of the molecules throughout the remainder of said sheet, and hardening said layer to hold said molecules in oriented position.

38. A method of orienting the surface molecules of an initially substantially homogeneous sheet of organic plastic material having orientable molecules, without affecting the state of orientation of the molecules throughout the remainder of said sheet, comprising pressing a relatively hard friction element into contact with the surface of said sheet and producing relative movement between said friction element and said sheet while maintaining pressure between said element and said sheet sufficient to generate such local heat over the area of contact therebetween as to soften the surface of said sheet to at least a measurable depth but insufficient to penetrate substantially beyond the surface of said sheet.

39. A method of orienting the surface molecules of an initially substantially homogeneous sheet of organic plastic material having orientable molecules, while leaving the molecules throughout the remainder of said sheet substantially disoriented, comprising pressing a relatively hard scraper element into frictional contact with a surface of said sheet and producing movement between said scraper element and said sheet while maintaining sufficient pressure between said element and said sheet to generate sufficient heat over the area of contact therebetween to soften the surface of said sheet.

40. A method of orienting the surface molecules of an initially substantially homogeneous sheet of organic plastic material having orientable molecules, while leaving the molecules throughout the remainder of said sheet substantially disoriented, comprising heating a relatively hard scraper element of heat-conducting material, pressing said element while heated into frictional contact with a surface of said sheet and producing movement between said scraper element and said sheet while maintaining sufficient pressure between said element and said sheet to soften the surface of said sheet.

41. A method of orienting the surface molecules of an initially substantially homogeneous sheet of organic plastic material having orientable molecules, while leaving the molecules throughout the remainder of said sheet substantially disoriented, comprising pressing a relatively hard scraper element into frictional contact with a surface of said sheet and producing movement between said scraper element and said sheet while maintaining sufficient pressure between said element and said sheet to generate sufficient heat over the area of contact therebetween to soften the surface of said sheet, said movement being in a direction at a predetermined angle to an edge of said sheet.

42. A method of orienting the surface molecules of an initially substantially homogeneous sheet of organic plastic material having orientable molecules, while leaving the molecules throughout the remainder of said sheet substantially disoriented, comprising pressing into frictional engagement with the surface of said sheet a relatively hard scraper element provided with a relatively sharp edge, softening the area of contact between said scraper and said sheet, moving said scraper element relatively rapidly with respect to said sheet and in contact therewith in a direction parallel to said edge, and simultaneously moving said sheet in a direction at a predetermined angle to the direction of motion of said scraper element while maintaining a relatively firm, uniform pressure therebetween.

43. A method of orienting the surface molecules of an initially substantially homogeneous sheet of organic plastic material having orientable molecules, while leaving the molecules throughout the remainder of said sheet substantially disoriented, comprising pressing into frictional engagement with the surface of said sheet a relatively hard scraper element provided with a relatively sharp edge, softening the area of contact between said scraper and said sheet, moving said scraper element relatively rapidly with respect to said sheet and in contact therewith in a direction parallel to said edge, and simultaneously moving said sheet in a direction at a predetermined angle to the direction of motion of said scraper element while maintaining a relatively firm, uniform pressure therebetween, the speed of said scraper edge being substantially greater than the speed of motion of said sheet with respect to said edge.

44. A method of orienting the surface molecules of an initially substantially homogeneous sheet of organic plastic material having orientable molecules, while leaving the molecules throughout the remainder of said sheet substantially disoriented, comprising pressing a rotatable, relatively hard scraper element into frictional contact with the surface of said sheet, softening the area of contact between said scraper element and said sheet, rotating said scraper element and producing relative movement between said element and said sheet while maintaining said element and said sheet in substantially uniform contact.

45. A method of orienting the surface molecules of an initially substantially homogeneous sheet of organic plastic material having orientable molecules, while leaving the molecules throughout the remainder of said sheet substantially disoriented, comprising pressing a rotatable, relatively hard scraper element into frictional contact with the surface of said sheet, softening the area of contact between said scraper element and said sheet, rotating said scraper element and producing relative movement between said element and said sheet while maintaining said element and said sheet in substantially uniform contact, the speed of the edge of said rotating scraper element with respect to said sheet being relatively high in comparison with the speed of said sheet with respect to the plane of rotation of said scraper.

46. A method of orienting the surface molecules of an initially substantially homogeneous sheet of an organic plastic having orientable molecules, without affecting the state of orientation of the molecules throughout the remainder of said sheet, comprising softening a layer on the surface of said sheet, stretching the material lying in said softened layer in a predetermined direction to orient substantially the molecules thereof by forming from said material a multiplicity of filaments, successively stretching said filaments, and then pressing said filaments into said softened surface and bonding them thereto in stretched condition.

47. A method of orienting the surface molecules of an initially substantially homogeneous sheet of an organic plastic having orientable molecules, without affecting the state of orientation of the molecules throughout the remainder of said sheet, comprising softening a layer on the surface of said sheet, stretching the material lying in said softened layer in a predetermined direction to orient substantially the molecules thereof by forming from said material a multiplicity of filaments, successively stretching said filaments, and then pressing said filaments into said softened surface and bonding them thereto in stretched condition by subjecting said sheet and said filaments to a further heat treatment.

48. A process of the character described comprising softening a surface layer of an initially substantially homogeneous sheet of an organic plastic having asymmetric molecules to render orientable the molecules of said layer, orienting the molecules of said softened layer by applying thereto a mechanical force to which said molecules are responsive, and polishing the oriented surface of said sheet by rubbing the same in a direction at an angle to the direction of molecular orientation thereof.

49. A process of the character described comprising softening a surface layer of an initially substantially homogeneous sheet of an organic plastic having asymmetric molecules to render orientable the molecules of said layer by heating said layer, orienting the molecules of said softened layer by applying thereto a mechanical force to which said molecules are responsive, and hardening said layer by cooling said layer to hold said molecules in oriented position and then further baking said sheet and said oriented layer.

50. A process of the character described comprising softening a surface layer on each surface of an initially substantially homogeneous sheet of an organic plastic having asymmetric molecules to render orientable the molecules of said layers, and orienting the molecules of said softened layers by applying thereto a mechanical force to which said molecules are responsive, the direction of application of the force applied to one surface of said sheet being at a predetermined angle to the direction of application of the force applied to the other surface of said sheet.

51. A process of the character described comprising softening a surface layer on each surface of an initially substantially homogeneous sheet of an organic plastic having asymmetric molecules to render orientable the molecules of said layers, and orienting the molecules of said softened layers by applying thereto a mechanical force to which said molecules are responsive, the direction of application of the force applied to one surface of said sheet being at an angle of substantially 90° to the direction of application of the force applied to the other surface of said sheet.

52. A process of the character described comprising softening a surface layer on each surface of an initially substantially homogeneous sheet of an organic plastic having asymmetric molecules to render orientable the molecules of said layers and orienting the molecules of said softened layers by applying thereto a mechanical force to which said molecules are responsive, the direction of application of the force applied to one surface of said sheet being at an angle of substantially 90° to the direction of application of the force applied to the other surface of said sheet and at an angle of substantially 45° to an edge of said sheet.

EDWIN H. LAND.
ROBERT P. BLAKE.